March 31, 1959 C. B. INGRAM 2,879,787
WHEELED PIPE LINE CARRIER
Filed Oct. 26, 1955 2 Sheets-Sheet 1
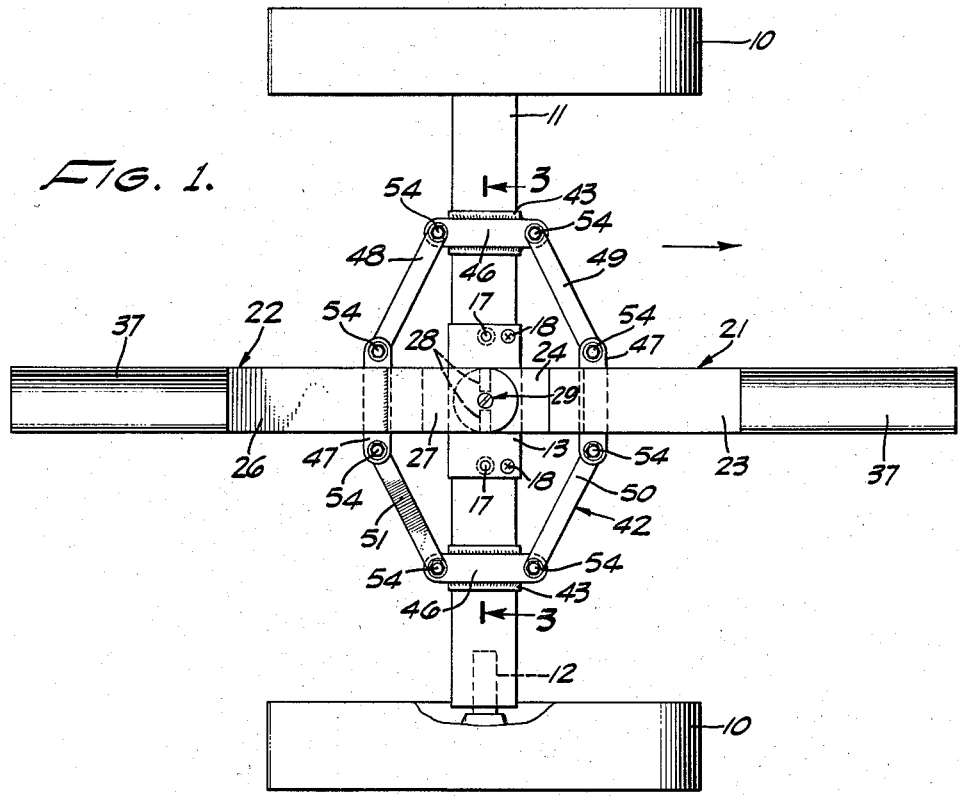
FIG. 1.
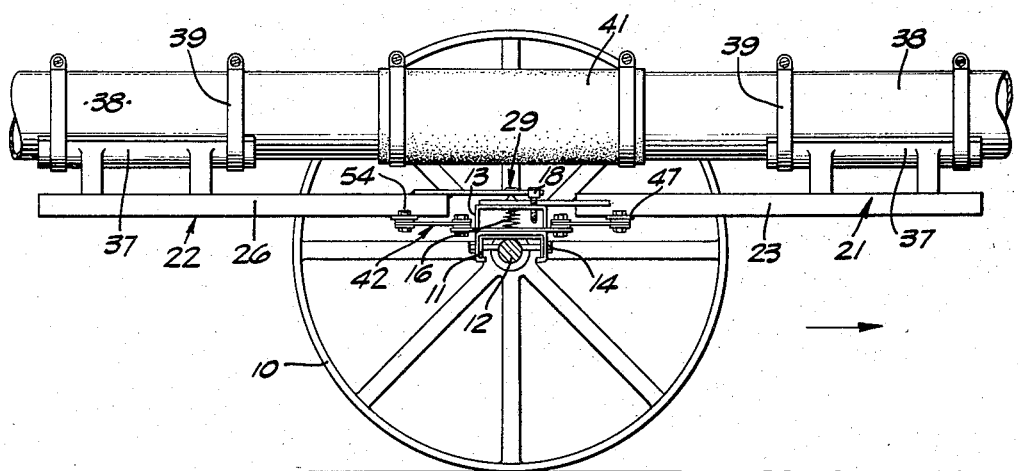
FIG. 2.
CARL B. INGRAM
INVENTOR.
BY 
ATTORNEY March 31, 1959 C. B. INGRAM 2,879,787
WHEELED PIPE LINE CARRIER
Filed Oct. 26, 1955 2 Sheets-Sheet 2
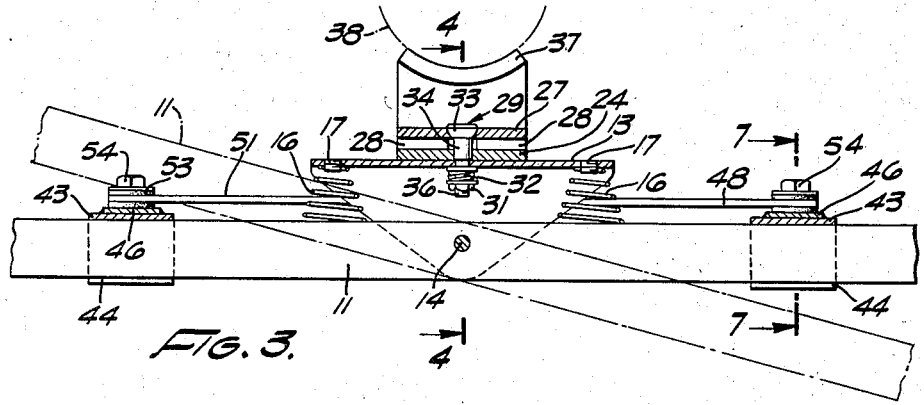
FIG. 3.
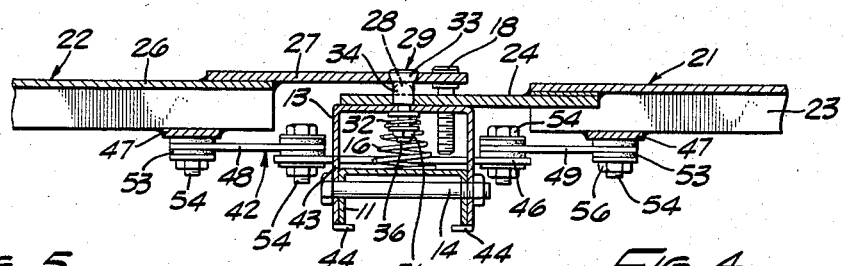
FIG. 5. FIG. 4.
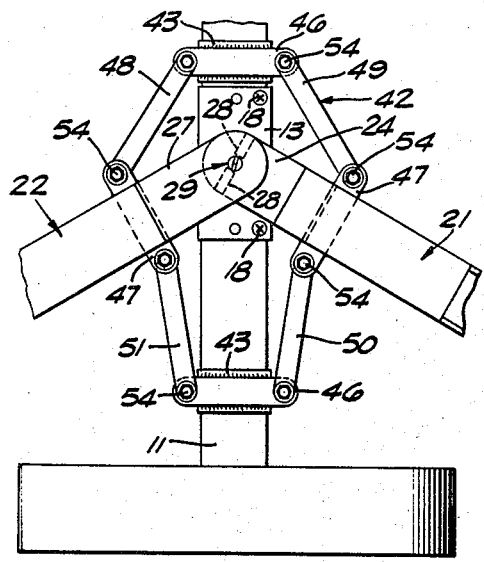
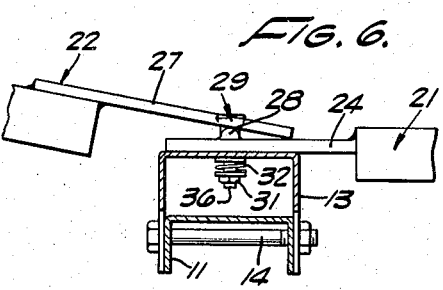
FIG. 6.
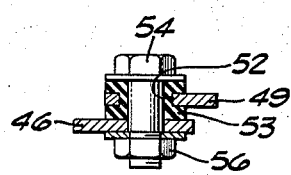
FIG. 8.
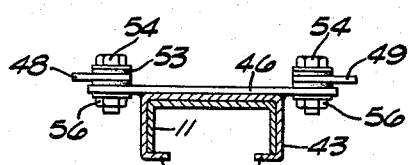
FIG. 7.
CARL B. INGRAM
INVENTOR.
BY
ATTORNEY

# United States Patent Office 2,879,787
Patented Mar. 31, 1959

2,879,787

WHEELED PIPE LINE CARRIER

Carl B. Ingram, El Monte, Calif.

Application October 26, 1955, Serial No. 542,889

14 Claims. (Cl. 137—344)

This invention relates to a wheeled pipe carriage adapted to track or follow substantially in the path of the lead one of a string of connected pipe sections. More particularly, the invention pertains to a flexible pipe carrier for use in transporting long lines of irrigation pipe sections, connected by flexible couplings, from one place to another.

There are a number of situations in which long, flexible lines of pipe must be transported from one place to another, a common situation being the case of sprinkler systems for irrigation of large fields. Other situations include sprinkler systems for fire fighting over rough roads and hills, as well as oil and mud lines in oil fields where the lines are moved frequently. To effect longitudinal movement of such lines it is necessary that the carriage means supporting the pipe be adapted to track or follow substantially in the path of a truck, tractor or other vehicle pulling the lead length of pipe. If such tracking or following did not take place, the pipe would tend to cut corners excessively, which would be intolerable where there are obstacles, such as trees in an orchard, preventing such corner cutting and making it necessary that the pipe follow a predetermined path. A construction of the type indicated is shown in United States Patent No. 2,652,282, issued to E. H. Willets on September 15, 1953, for an Irrigation Apparatus.

The prior art pipe carriers have been deficient in a number of important respects, including the following: (a) they are necessarily constructed so as to maintain the pipe at an excessively high elevation above the ground, which results in a very substantial tendency for the carriages to tip over when traveling around corners; (b) they were excessively expensive in that they could not be fabricated from conventional parts but instead required special castings and the like. Because of these deficiencies in prior art pipe carriers or carriages, many persons desiring to irrigate large fields, etc., have resorted to such means as rigid long lengths of pipe supported in axially spaced hoops and adapted to roll laterally across a field, as well as to other constructions which have limited the market for the present type of apparatus.

In view of the above factors characteristics of carriages of the type indicated, it is an object of the present invention to provide a simple, economical and rugged pipe carriage which supports the pipe at a point close to the ground to thus eliminate danger of tipping over, and which eliminates the need for direct connection between link portions of the carriage and rigid pipe elements.

Another object is to provide a pipe carrier embodying novel linkage means adapted to cause the wheel axes to bisect precisely the angle between connected pipe sections, said linkage means eliminating the need for separate frames on the carriage and which are pivoted adjacent the wheels.

A further object of the invention is to provide a carriage which may be readily fabricated out of standard channel components and the like, and requires only simple clamps and other relatively inexpensive parts.

A further object is to provide a pipe carriage which is extremely flexible in operation and may tilt from side to side or pivot forwardly and rearwardly while traveling over rough ground, all without danger that the carriage will tip over.

A further object is to provide an improved pipe carrier of a type adapted when pulled from either end to track or follow substantially in the path of a vehicle pulling the lead pipe section, so that the pipe sections may be moved around corners without excessive cutting thereof. The invention is, therefore, particularly adapted for use in orchards, vineyards, parks, golf courses, cemeteries and other places where obstructions prevent use of other wheeled type systems.

These and other more specific objects will appear upon reading the following specification and claims and upon considering in connection therewith the attached drawings to which they relate.

In the drawings:

Figure 1 is a top plan view of a carriage embodying the present invention, shown in a straight condition and prior to mounting of a pipe thereon;

Figure 2 is a side elevation of the showing of Figure 1, but after mounting of two sections of a pipe string thereon;

Figure 3 is a fragmentary transverse sectional view taken along line 3—3 in Figure 1, and looking in the direction of the arrows;

Figure 4 is a fragmentary longitudinal sectional view of the pipe carrier, taken along line 4—4 of Figure 3;

Figure 5 is a fragmentary plan view corresponding to the lower portion of Figure 1, but illustrating the carriage in a jack-knifed condition which occurs during tracking thereof around a corner;

Figure 6 is a fragmentary longitudinal view, partially in elevation and partially in section, corresponding generally to Figure 4 but illustrating the pivotal movement between the forward and rear carriage frame sections which occurs during movement of the carriage through a depression;

Figure 7 is a fragmentary longitudinal sectional view taken along line 7—7 of Figure 3, and illustrating the sliding pivot connection between the transverse frame section and the linkage elements; and Figure 8 is a detail sectional view illustrating the rubber grommet connection between the various link means.

Referring to the drawings, the apparatus may be seen to comprise generally a pair of corresponding wheels 10 connected for rotation about a common axis by a transverse frame member or axle-tree 11. In the illustrated form, the wheels 10 are journaled on stub shafts 12 which in turn are welded to transverse frame member 11, the latter preferably comprising a channel bar having downwardly extending flanges. Mounted at the center of member 11 is a rocker member 13 which is also generally channel shaped and has an upper web portion and downwardly extending triangular side flanges. The lower or apex portions of the side flanges are pivotally connected to member 11 by means of a longitudinal pivot bolt 14 which extends through the side flanges of both members 11 and 13.

A pair of volute springs 16 are seated between the webs of members 11 and 13 and on opposite sides of pivot bolt 14, as best shown in Figure 3, for the purpose of resiliently maintaining these webs in parallel relation except when operating pressures created when the carriage passes over rough ground overcome the spring bias. The upper and smaller ends of volute springs 16 are seated over spring guides 17, the latter being illustrated in the form of screws extended through the ends of web of rocker 13.

With the described rocker arrangement, pivoting of the transverse or cross frame member 11 relative to rocker 13, between the solid and dashed line positions shown in Figure 3, is resiliently permitted. However, means are provided to lock rocker 13 against pivoting movement relative to member 11 when desired, these means comprising a pair of bolts 18 which are threaded downwardly through the ends of the web of rocker 13 for engagement with the web of member 11. Bolts 18, which may be referred to as stop bolts, are threaded into engagement with the associated member 11 on one of the carriages for a long string of pipe. This one carriage then becomes the guide carriage tending to control the remaining carriages and thus, for example, maintain a number of upwardly projecting irrigating or sprinkler pipes parallel to the one at the guide carriage.

Pivotally and swivelly associated with the upper portion or web of rocker 13 are a pair of frame members 21 and 22 which may be referred to as longitudinal frame members since they extend parallel to the pipe, and are perpendicularly to transverse frame member 11 when the pipe string is moving in a straight line. For convenience of description, member 21 will be referred to as forward frame member and member 22 as the rear frame member, it being assumed that the carriage is moving to the right in Figures 1 and 2 although it could, of course, move in either direction. Forward frame member 21 comprises a channel 23 having downwardly extending flanges, and a tongue plate 24 welded to the underside of the web of channel 23 and seated rotatably on the web portion of rocker 13. Similarly, rear frame member 22 comprises a channel 27 having a tongue plate 27 welded to the upper side of its web, the tongue plate extending forwardly and above tongue plate 24.

A pair of transversely aligned fulcrum members 28 are welded to the upper surface of lower tongue plate 24 and serve as a pivot or fulcrum for upper tongue plate 27. A bolt 29 is extended vertically downwardly through apertures in the upper and lower tongue plates, as well as through an aperture in the web of rocker 13. More specifically, bolt 29 is formed with a semi-spherical head 33 which seats rotatably in a spherical seat in upper tongue plate 27, with a relatively thick shank 34 which extends through lower tongue plate 24 and seats on the upper surface of the web of rocker 13, and with a reduced threaded shank 36 which extends through the web of rocker 13 and has a nut 31 threaded onto its lower end. A helical compression spring 32 is seated between washers at nut 31 and at the underside of rocker 13, and serves the function of resiliently maintaining the bolt head seated in upper tongue 27 and the shank 34 seated on rocker 13.

The described arrangement permits a large degree of pivotal and swivel movement, in both horizontal and vertical planes, between forward and rear longitudinal frame members 21 and 22. For example, pivoting in a vertical plane to the pivoted position shown in Figure 6 will occur when the carriage passes through a depression in the surface over which it is traveling.

A pair of pipe cradle members 37 are mounted on the upper sides of the channels 23 and 26 of the respective forward and rear longitudinal frame members 21 and 22. As shown in Figure 2, the cradles 37 are adapted to seat tubular water conduits, such as rigid metal pipe sections 38 which are secured thereto by means of tie straps 39. The adjacent ends of pipe sections 38 are connected by a flexible coupling 41 which may be formed in a number of ways and of a number of materials, the illustrated one being of rubber.

It is to be understood that one of the described carriages or carriers is provided between each pair of pipe sections 38 of a long string of pipe sections. In a frequent use of the pipe string a vertical sprinkler pipe, not shown, is mounted on each pipe section 38 at a carriage and is provided at its upper end with a sprinkler head adapted to spray irrigation water over a wide area.

In order that the pipe sections and carriages will follow in the path of a truck, tractor or other element pulling the lead pipe section and carriage, the common axis of wheels 10 must at all times bisect the angle formed between forward and rear longitudinal frame members 21 and 22; i.e., between the pipe sections 38. If this bisecting relationship is not maintained, for example if the wheel axis remained perpendicular to one or the other of the pipe sections 38, then the carriages and pipe sections would not follow or track adequately and it would be substantially impossible to move the string of pipe sections around a corner.

According to the present invention, a shifting-pivot linkage means 42 is provided to maintain transverse frame member 11 (which is parallel to the wheel axis) in exact bisecting relationship relative to frame sections 21 and 22 (which are parallel to pipe sections 38). The linkage 42 includes a pair of channel-shaped slide elements 43 which nest over frame member 11 as best shown in Figure 7. Elements 43 have their flanges bent inwardly at 44 to prevent them from being lifted off the transverse frame 11, which serves as a slide or guide. A lug bar 46 is welded longitudinally of the carriage on the upper side of each slide channel 43 for connection to link means to be described subsequently. Lug bars 47 are also welded transversely of the apparatus and on the undersides of channels 23 and 26 of forward and rear longitudinal frame members 21 and 22, respectively, these lug bars 47 being spaced equal distances on opposite sides of vertical pivot bolt 29.

Connecting links 48–51, of equal length, are connected between the respective projecting ends of lug bars 46 and 47. In order to permit the described pivotal movements between longitudinal frame members 21 and 22 (for example to the upwardly pivoted position shown in Figure 6) and also to permit the described rocking action of rocker member 13, the connections between the various links and lug bars are made such as to permit a substantial degree of freedom or play. Thus, and as best shown in Figure 8, one of each pair of associated links and lug bars is formed with a relatively large opening 52 through which a rubber grommet or bushing 53 is inserted. A vertical connecting bolt 54 is then inserted through the grommet and through the remaining link or lug bar for securing in position by a nut 56, suitable washers being provided. This bolt and grommet construction permits a substantial degree of freedom without at the same time impairing the action of the shifting pivot linkage means 42 in maintaining cross member 11 in an angle-bisecting position at all times.

Proceeding next to a description of the operation of the carriage, let it be assumed that the parts are initially in the positions shown in Figures 1 and 2, with stop bolts 18 threaded upwardly out of stopping engagement with transverse frame member 11. The slide members 43 are then spaced equal distances on opposite sides of vertical pivot bolt 29, and transverse member 11 is perpendicular to forward and rear longitudinal frame members 21 and 22 and to the connected pipe sections 38 mounted thereon. The lead carriage and pipe string, not shown, are then pulled along a desired path of movement.

After the vehicle pulling the lead pipe section turns a corner, either in a curve or relatively sharply, this action is transmitted back through the various pipe sections 38 and causes the two illustrated pipe sections to assume an angular or jack-knifed position such as the one shown in Figure 5, pivoting of the longitudinal frame sections then occurring about the vertical pivot bolt 29. Stated otherwise, the pivoting of the pipe sections 38 to a jacknifed condition is transmitted through the cradles 37 and the frame members 21 and 22 to result in pivoting of the latter around the vertical bolt 29. Such pivoting of the frame members 21 and 22 operates through the links 48–51 associated therewith to move slides 43 along transverse frame member 11, for example to the position shown in Figure 5 at which the upper illustrated member 43 is relatively adjacent bolt 29 whereas lower member 43 is relatively remote therefrom. Since the links 50 and 51 are of equal length, as are links 48 and 49, transverse frame member 11 is caused to assume a position at which it exactly bisects the angle between longitudinal frame members 21 and 22 as desired. The same action, of course, occurs for jackknifing in the other direction, or to various intermediate positions. It follows that the carriage will track substantially along the path of the vehicle pulling the lead pipe section.

Should the carriage pass through a depression in the ground or road, members 21 and 22 may pivot vertically about the bolt head 33, for example to the position shown in Figure 6, this action being permitted by the described play in the connections between the links 48–51 and lugs 46 and 47 such as was described in connection with Figure 8.

When the pipe string is being drawn over unlevel ground, for example along the side of a hill, relative pivotal movement will occur between rocker 13 (and the pipe sections associated therewith by means of longitudinal frame members 21 and 22) and the transverse frame member 11. Thus, relative pivoting of the rocker 13 about its pivot bolt 14, such as between the positions shown in solid and dashed lines in Figure 3, will occur an will overcome the spring bias effected by the volute springs 16. This action is possible because of the freedom permitted by grommets 53, etc., between the links and their mounting lugs.

The lead carriage for a pipe string is frequently adjusted so that its rocker 13 is maintained in a predetermined fixed pivoted relation relative to its frame member 11, this being accomplished by screwing the stop bolts 18 into engagement with the member 11. Since rocker 13 of the lead carriage is fixed relative to frame 11 thereof, when the lead carriage passes along the side of a hill, for example, the frame members 21 and 22 and pipe sections 38 thereon will tilt with transverse frame member 11, and any upwardly projecting pipes screwed into the pipe sections 38 will tilt correspondingly. This tilting action is then transmitted rearwardly through the various pipe sections 38 and will cause corresponding tilting of the remaining pipe sections 38 and upwardly projecting pipes, even though the remaining carriages are on level ground or are not tilted as is the first carriage. This latter action is permitted because of the tilting between rocker 13 and transverse frame member 11, of all but the lead carriage, and is desirable since it causes all of the upwardly projecting pipes to remain parallel.

The described shifting pivot construction of the linkage means 42 is of extreme importance since it causes frame 11 to bisect exactly the angle of the pipe sections, thus resulting in the best possible tracking or following action. Such angle bisecting is effected despite the fact that the pipe sections 38 are mounted relatively close to the ground, below the upper portions of wheels 10 as shown in Figure 2, so that it is difficult or impossible for the carriages to tip over. This is to be contrasted with the prior art constructions in which the angle was not exactly bisected, or in which the pipes 38 necessarily had to be mounted at a high elevation tending to result in tipping over of the carriages. Also, the present construction effects bisecting of the angle without any pivoting of frame members at or adjacent the wheels 10, with resultant elimination of complicated constructions frequently difficult or expensive to maintain.

While the particular apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. A self-tracking carriage for supporting the flexibly coupled ends of pipe strings and the like, which comprises a pair of wheels, a frame member connecting said wheels in generally coaxial relationship, means movably supporting a flexible coupling on said frame member in a manner permitting conduit sections forwardly and rearwardly of said wheels to assume various angles relative to each other, and shifting pivot means movably interconnecting said frame member and said coupling supporting means and operable to shift the axis of said wheels in a manner to bisect said angles at all times.

2. The invention as claimed in claim 1, in which said frame member extends parallel to said wheel axis, and said shifting pivot means includes a slide element slidably mounted on said frame member and a pair of links pivotally associating said slide element with said flexible coupling supporting means.

3. A self-tracking carriage for supporting the flexibly coupled ends of pipe strings and the like, which comprises two wheels, a transverse frame member connecting said wheels in substantially coaxial relationship, two elongated frame members pivotally connected at their adjacent ends to the central portion of said transverse frame member and adapted to assume various angles relative to each other, means to secure a pair of pipe sections one to the remote ends of each of said elongated frame members for movement therewith, and shifting pivot linkage means operatively and movably interconecting said elongated frame members with said transverse frame member and operable to effect shifting of the axis of said wheels to bisect the angle between said pipe sections at all times.

4. The invention as claimed in claim 3, in which said shifting pivot linkage means includes a pair of equilength links slidably and pivotally connected to said transverse frame member at their outer ends, and respectively pivotally connected to said elongated frame members at their inner ends and at points spaced on opposite sides of said transverse frame member.

5. The invention as claimed in claim 3, in which the connections between said frame members, and the construction of said shifting pivot linkage means, include means loosely connecting the same and permitting substantial relative tilting of said frame members relative to each other.

6. A carriage for pipe strings and the like, which comprises a pair of wheels, a transverse frame connecting said wheels for rotation about a transverse axis, a rocker member mounted on said transverse frame for pivoting about a longitudinal axis, forward and rear longitudinal frames pivotally connected to said rocker member for rotation about generally vertical axes, means on said longitudinal frames to mount pipe sections longitudinally thereon and at a relatively low elevation above the ground, and means connecting said longitudinal frames with said transverse frame to maintain said wheel axis in bisecting relationship relative to the angles formed between said pipe sections.

7. A carriage for pipe strings and the like, which comprises a pair of wheels, a transverse frame bar connecting said wheels for rotation about a common transverse axis, a rocker member mounted at the center of said transverse bar for pivoting about a longitudinal axis, forward and rear longitudinal frame bars pivotally connected to said rocker member for rotation about a generally vertical axis, means on said longitudinal bars to mount pipe sections longitudinally thereon, slide elements slidably mounted on said transverse bar on opposite sides of said longitudinal bars, and a pair of links pivotally connected to each of said slide elements and to said longitudinal bars forwardly and rearwardly of said transverse bar, said links being so mounted as to cause said common wheel axis to bisect at all times the angle formed by said pipe sections.

8. The invention as claimed in claim 7, in which spring means are provided between said rocker member and transverse bar to bias the same toward a predetermined relative pivoted position.

9. The invention as claimed in claim 7, in which adjustable stop means are provided between said rocker member and transverse bar and are selectively operable to lock the same against pivoting relative to each other.

10. The invention as claimed in claim 7, in which a vertical bolt having a round head is provided to pivotally connect said longitudinal frame bars, said bolt being adapted to permit said longitudinal frame bars to pivot about a generally horizontal transverse axis.

11. The invention as claimed in claim 7, in which bolts and rubber grommets are provided to connect said links to said bars in a manner permitting pivotal movement therebetween in both horizontal and vertical planes.

12. In a self-tracking portable irrigating conduit train of the type having a water supply conduit formed from flexibly coupled long sections of rigid conduit, that improvement which comprises a two-wheeled carriage arranged to support the conduit sections at said flexible couplings, means secured to adjacent conduit sections and by-passing the fluid-tight coupling between adjacent sections for transmitting pulling forces from end to end of said conduit train, and means interconnecting the ends of the conduit sections with the adjacent carriage axle and operable in response to a change in the direction of movement of a leading conduit section to shift the associated trailing carriage axle sufficiently to maintain a bisecting relationship between adjacent conduit sections.

13. A self-tracking portable irrigating conduit train comprising a plurality of long conduit sections arranged end-to-end in flexibly coupled fluid-tight relation and supported parallel to the ground by a two-wheeled carriage positioned at each coupling and at the forward and rear ends of said train, means independent of the flexible coupling for transmitting pulling forces between conduit sections including linkage means for shifting said carriages automatically to bisect the angle between associated conduit sections whereby a trailing carriage is constrained to follow in the tracks of a leading carriage, said linkage means being connected between said two-wheeled carriage and the pipe sections extending in opposite directions from the flexible coupling associated with a particular two-wheeled carriage.

14. That improvement in a self-tracking wheel-supported irrigation conduit train which comprises a carriage suitable for supporting flexibly coupled junctions of conduit sections arranged in end-to-end relation, said carriage having an axle, means secured transversely of the midportion of said axle for transmitting a pulling force lengthwise of the conduit train and including clamping means for clamping conduit sections to the opposite ends thereof with the adjacent conduit ends spaced apart in the area overlying the carriage axle, means for coupling said conduit ends together in a fluid-tight manner while allowing each to pivot through an arc independently of the other, and means interconnecting the trailing end of a leading conduit section with its associated carriage axle and operable to pivot said axle in the same direction as said leading conduit section moves and by one-half the angle whereby said trailing carriage trails in the path taken by the leading carirage.

References Cited in the file of this patent
UNITED STATES PATENTS

| | | |
|---|---|---|
| 757,338 | Nolting | Apr. 12, 1904 |
| 921,161 | Rand | May 11, 1909 |
| 1,429,756 | Mitchell | Sept. 19, 1922 |